United States Patent
Shimamura

(10) Patent No.: US 9,243,679 B2
(45) Date of Patent: Jan. 26, 2016

(54) ANTI-VIBRATION DEVICE

(75) Inventor: Akio Shimamura, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 180 days.

(21) Appl. No.: 13/824,570

(22) PCT Filed: Sep. 21, 2011

(86) PCT No.: PCT/JP2011/071419
§ 371 (c)(1),
(2), (4) Date: Mar. 18, 2013

(87) PCT Pub. No.: WO2012/039406
PCT Pub. Date: Mar. 29, 2012

(65) Prior Publication Data
US 2013/0187318 A1    Jul. 25, 2013

(30) Foreign Application Priority Data
Sep. 22, 2010    (JP) .................................. 2010-212278

(51) Int. Cl.
*F16F 5/00*    (2006.01)
*F16F 13/08*    (2006.01)
(Continued)

(52) U.S. Cl.
CPC ............... *F16F 13/08* (2013.01); *B60K 5/1208* (2013.01); *F16F 13/10* (2013.01)

(58) Field of Classification Search
CPC ......... F16F 13/08; F16F 13/085; F16F 13/10; F16F 13/102; F16F 13/105
USPC .................. 267/140.11, 140.13, 140.3, 140.4, 267/140.5, 141, 292, 293
See application file for complete search history.

(56) References Cited

U.S. PATENT DOCUMENTS 4,632,370 A * 12/1986 Ticks et al. .................... 267/219
4,733,854 A *  3/1988 Miyamoto ............... 267/140.13
(Continued)

FOREIGN PATENT DOCUMENTS

CN        1769735 A      5/2006
CN      101607562 A     12/2009
(Continued)

OTHER PUBLICATIONS

Chinese Office Action, dated Apr. 25, 2014, issued in Chinese Patent Application No. 201180045378.8.
(Continued)

*Primary Examiner* — Nicholas J Lane
(74) *Attorney, Agent, or Firm* — Sughrue Mion, PLLC

(57) ABSTRACT

The present invention is an anti-vibration device (1) that includes: a first mounting component (2) that is cylindrically-shaped and joined to one of a vibration generating portion and a vibration receiving portion; a second mounting component (3) that is joined to the other one of the vibration generating portion and the vibration receiving portion; a first elastic body (4) that elastically joins the first mounting component (2) and the second mounting component (3) together; a fluid chamber (5) that is provided inside the first mounting component (2) and inside which a fluid is sealed; a first partitioning wall (10) that divides the fluid chamber (5) in an axial direction so as to define a main fluid chamber (8), a portion of wall surfaces of which is the first elastic body, and an auxiliary fluid chamber; a second partitioning wall (12) that divides the main fluid chamber (8) in a circumferential direction so as to define a plurality of divided main fluid chambers (11); and a plurality of restricting passages (35) that enable the plurality of divided main fluid chambers (11A, 11B) and the auxiliary fluid chamber (9) to communicate with each other, wherein at least a portion of the first partitioning wall (10) is formed by a second elastic body (26) that is elastically deformable, the second partitioning wall (12) is joined to both the second mounting component (3) and the second elastic body (26), and the second elastic body (26) has differences in rigidity in a radial direction.

5 Claims, 5 Drawing Sheets

(51) Int. Cl.
*F16F 13/10* (2006.01)
*B60K 5/12* (2006.01)

(56) References Cited

U.S. PATENT DOCUMENTS

| | | | |
|---|---|---|---|
| 5,102,105 | A | 4/1992 | Hamaekers et al. |
| 5,172,893 | A * | 12/1992 | Bouhier et al. .......... 267/140.12 |
| 6,663,090 | B2 * | 12/2003 | Simuttis et al. .......... 267/140.13 |
| 6,981,696 | B2 * | 1/2006 | Hatano et al. ............ 267/140.12 |
| 8,056,888 | B2 * | 11/2011 | Siemer et al. .............. 267/140.5 |
| 8,308,147 | B2 * | 11/2012 | Kojima et al. ............ 267/140.12 |
| 2004/0173955 | A1 | 9/2004 | Groth et al. |
| 2009/0026671 | A1 * | 1/2009 | Kojima et al. ................ 267/121 |
| 2012/0091640 | A1 * | 4/2012 | Ogawa et al. ............ 267/140.11 |
| 2013/0175745 | A1 * | 7/2013 | Kojima et al. ........... 267/140.13 |

FOREIGN PATENT DOCUMENTS

| | | | |
|---|---|---|---|
| JP | 2005-61482 A | | 3/2005 |
| JP | 2006-125617 A | | 5/2006 |
| JP | 2007-278399 A | | 10/2007 |
| JP | 2009-243541 A | | 10/2009 |
| JP | 2010-78092 A | | 4/2010 |
| WO | WO 2010126060 A1 * | 11/2010 | .............. F16F 13/10 |

OTHER PUBLICATIONS

International Search Report for PCT/JP2011/071419 dated Dec. 27, 2011.

* cited by examiner

ANTI-VIBRATION DEVICE

TECHNICAL FIELD

The present invention relates to an anti-vibration device that is used, for example, in automobiles and industrial machinery and the like, and that absorbs and attenuates vibration in vibration generating portions such as engines. Priority is claimed on Japanese Patent Application No. 2010-212278, filed Sep. 22, 2010, the contents of which are incorporated herein by reference.

TECHNICAL BACKGROUND

An anti-vibration device, for example, such as that illustrated in Patent document 1 (see below) is known that demonstrates attenuation characteristics towards vibration in both an axial direction and a radial direction. This anti-vibration device includes: a first mounting component that has a cylindrical shape and is joined to one of a vibration generating portion and a vibration receiving portion; a second mounting component that is joined to the other of the vibration generating portion and the vibration receiving portion and is placed inside the first mounting component; an intermediate cylinder that is fitted inside the first mounting component; a first elastic body that elastically joins the intermediate cylinder to the second mounting component; a partitioning component that is fitted inside the first mounting component and forms a first pressure-receiving fluid chamber between itself and the first elastic body; a diaphragm that is adhered to the first mounting component and forms an auxiliary fluid chamber between itself and the partitioning component; a second elastic body that elastically joins the intermediate cylinder to the second mounting component and that forms a second pressure-receiving fluid chamber between itself and the first elastic body; and a partitioning wall portion that is provided on one of the first elastic body and the second elastic body and partitions the second pressure-receiving fluid chamber into a pair of chambers.

DOCUMENTS OF THE PRIOR ART

Patent Documents

[Patent document 1] Japanese Unexamined Patent Application No. 2007-278399

DISCLOSURE OF THE INVENTION

Problems to be Solved by the Invention

However, the above-described conventional anti-vibration device requires three types of fluid chambers, namely, the first pressure-receiving fluid chamber, the second pressure-receiving fluid chamber, and the auxiliary fluid chamber, and also requires two types of restricting passages, namely, the restricting passages that join the first pressure-receiving fluid chamber and the second pressure-receiving fluid chamber to the auxiliary fluid chamber. Namely, in a conventional anti-vibration device, there remains plenty of scope for improvement regarding a reduction in the size of the device, the simplicity of the structure, and the simplicity of the manufacturing process.

The present invention was conceived in view of the above-described circumstances and it is an object thereof to provide an anti-vibration device that, while achieving a reduction in size, a simplification of the structure, and a simplification of the manufacturing process, also demonstrates attenuation characteristics towards vibration in both an axial direction and a radial direction.

Means for Solving the Problem

In order to solve the above-described problems and achieve the desired objects, the present invention employs the following means. The anti-vibration device of the present invention is provided with: a first mounting component that is cylindrically-shaped and joined to one of a vibration generating portion and a vibration receiving portion; a second mounting component that is joined to the other one of the vibration generating portion and the vibration receiving portion; a first elastic body that elastically joins the first mounting component and the second mounting component together; a fluid chamber that is provided inside the first mounting component and inside which a fluid is sealed; a first partitioning wall that divides the fluid chamber in an axial direction so as to define a main fluid chamber, a portion of wall surfaces of which is the first elastic body, and an auxiliary fluid chamber; a second partitioning wall that divides the main fluid chamber in a circumferential direction so as to define a plurality of divided main fluid chambers; and a plurality of restricting passages that enable the plurality of divided main fluid chambers and the auxiliary fluid chamber to communicate with each other. Furthermore, at least a portion of the first partitioning wall is formed by a second elastic body that is elastically deformable, and the second partitioning wall is joined to both the second mounting component and the second elastic body, and the second elastic body has differences in rigidity in a radial direction.

According to the anti-vibration device of the present invention, when vibration is input in an axial direction from a vibration generating portion so that the first mounting component and the second mounting component are displaced relative to each other in the axial direction, the first elastic body that joins the two mounting components together is elastically deformed. At this time, the second partitioning wall, which is joined to the second mounting component, is displaced together with the second mounting component, and the second elastic body is also elastically deformed. At this time, because the second elastic body has variations in rigidity in a radial direction, the amount of deformation of the second elastic body can be made to vary depending on the position in the radial direction. Because of this, it becomes possible to change the volumes of the divided main fluid chambers, and to cause a fluid to circulate between the divided main fluid chambers and the auxiliary fluid chamber through the restricting passages so that liquid column resonance is generated in the restricting passages. This liquid column resonance makes it possible to absorb and attenuate vibration in an axial direction.

Moreover, when vibration is input in a radial direction from a vibration generating portion so that the first mounting component and the second mounting component are displaced relative to each other in the radial direction, in addition to the first elastic body being elastically deformed, the second partitioning wall is also displaced or deformed following the second mounting component. Because of this, it becomes possible to change the volumes of the divided main fluid chambers. Consequently, it is possible to generate liquid column resonance, and to absorb and attenuate vibration in a radial direction.

As a result of the above, by providing the divided main fluid chambers and auxiliary fluid chamber, as well as the restricting passages that enable these fluid chambers to communicate, it becomes possible to demonstrate attenuation characteristics towards vibration in both an axial direction and a radial direction. As a result, the fluid chambers and restricting passages can be reduced, and it is possible to achieve a reduction in size, a simplification of the structure, and a simplification of the manufacturing process.

Moreover, it is also possible for the second elastic body to have different thicknesses at each position in a radial direction.

In this case, because the thickness of the second elastic body is different at each position in a radial direction, the second elastic body has differences in its rigidity in the radial direction. As a result, it is possible to form the second elastic body from a single elastic material, and even greater simplifications of the structure and of the manufacturing process can be achieved.

Moreover, it is also possible for a central portion in a radial direction of the second elastic body to be joined to the second partitioning wall, while it is also possible for an outside circumferential edge portion of the second elastic body to be joined to the first mounting component, and it is also possible for an intermediate portion that is located between the central portion and the outside circumferential edge portion to have differences in rigidity in a radial direction.

In this case, when the first mounting component and the second mounting component and second partitioning wall are displaced relative to each other in an axial direction, an intermediate portion of the second elastic body that is positioned between the outside circumferential edge portion thereof, which is joined to the first mounting component, and a central portion thereof, which is joined to the second partitioning wall, is elastically deformed. At this time, because the intermediate portion of the second elastic body has differences in rigidity in a radial direction, the amount of deformation of the intermediate portion of the second elastic body can be made to vary depending on the position in the radial direction, and the aforementioned operating effects can be reliably achieved.

Moreover, it is also possible for the rigidity of the intermediate portion of the second elastic body to gradually increase from the central portion side towards the outside circumferential edge portion side.

In this case, the rigidity of the intermediate portion of the second elastic body gradually increases from the central portion side towards the outside circumferential edge portion side. Because of this, when the first mounting component and the second mounting component and second partitioning wall are displaced relative to each other in an axial direction, the connecting portion where the intermediate portion of the second elastic body connects to the central portion is elastically deformed following the displacement of the second partitioning wall, while any elastic deformation of the other portions is suppressed. As a consequence, it becomes easy to change the volumes of the divided main fluid chambers, and to effectively demonstrate attenuation characteristics towards vibration in an axial direction.

Moreover, in a joined state in which the first mounting component is joined to one of the vibration generating portion and the vibration receiving portion, and the second mounting component is joined to the other one of the vibration generating portion and the vibration receiving portion, it is also possible for the intermediate portion of the second elastic body to be curved so as to protrude in an axial direction towards the main fluid chamber side.

In this case, in the aforementioned joined state, the intermediate portion of the second elastic body is curved so as to protrude in an axial direction towards the main fluid chamber side. Because of this, when vibration in a radial direction is input into this anti-vibration device so that the first mounting component and the second mounting component are displaced relative to each other in a radial direction, it is easy to elastically deform the intermediate portion such that the curvature of the curved portion in the intermediate portion of the second elastic body is increased and the volumes of the divided main fluid chambers are decreased, or such that the curvature of the curved portion is decreased and the volumes of the divided main fluid chambers are increased. As a result of this, it becomes easy to change the volumes of the divided main fluid chambers, and to effectively demonstrate attenuation characteristics towards vibration in a radial direction.

Moreover, it is also possible in a joined state in which the first mounting component is joined to one of the vibration generating portion and the vibration receiving portion, and the second mounting component is joined to the other one of the vibration generating portion and the vibration receiving portion, it is also possible for the central portion of the second elastic body to be formed in a planar shape extending in a radial direction, while it is also possible for the intermediate portion of the second elastic body is inclined in the axial direction relative to the central portion.

In this case, in the aforementioned joined state, the central portion of the second elastic body extends in a radial direction, while the intermediate portion thereof is inclined in an axial direction relative to the central portion. Because of this, when vibration is input into this anti-vibration device in a radial direction so that the first mounting component and the second mounting component are displaced relative to each other in the radial direction, it is easy for the intermediate portion to be elastically deformed with the connecting portion where the intermediate portion of the second elastic body connects to the central portion being used as the deformation starting point. As a consequence, it becomes easy to change the volumes of the divided main fluid chambers, and to effectively demonstrate attenuation characteristics towards vibration in a radial direction.

Effects of the Invention

According to the anti-vibration device of the present invention, it is possible to demonstrate attenuation characteristics towards vibration in both an axial direction and a radial direction while achieving a reduction in the size, a simplification of the structure, and a simplification of the manufacturing process.

BEST EMBODIMENTS FOR IMPLEMENTING THE INVENTION

Figure 1:
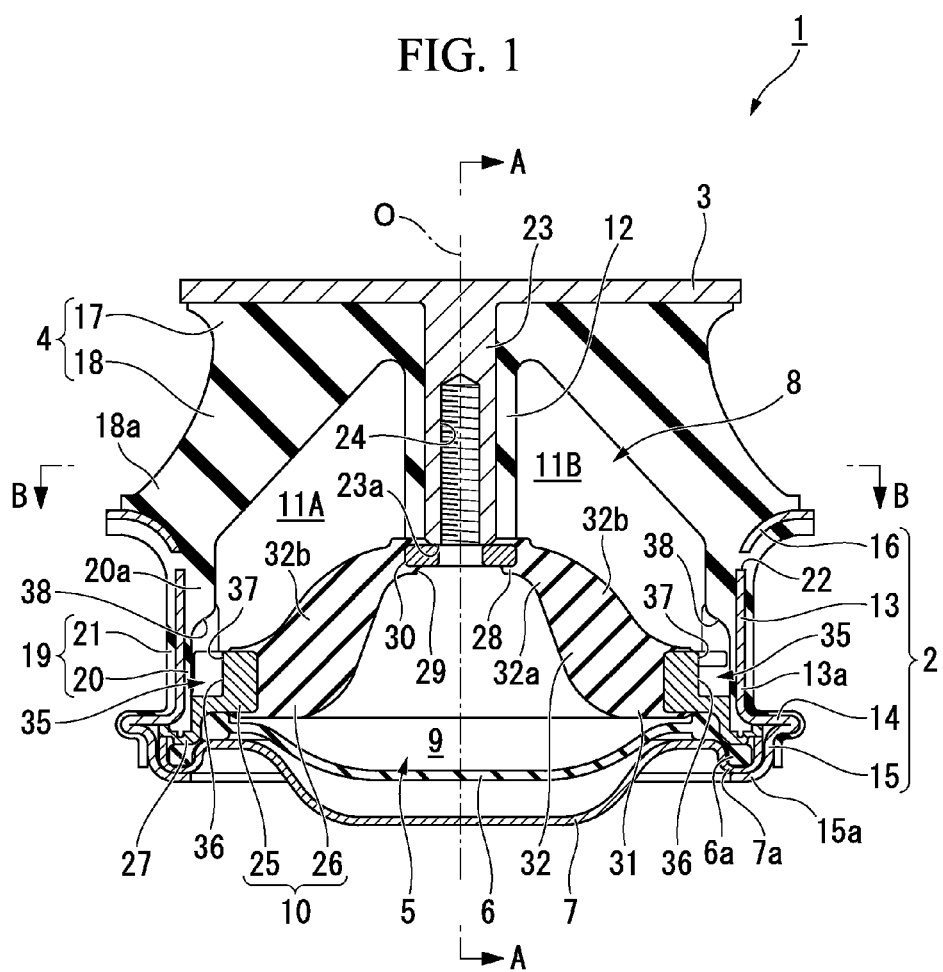
FIG. 1 is a vertical cross-sectional view taken in a direction parallel with an anti-vibration device according to an embodiment of the present invention.

Hereinafter, an anti-vibration device according to an embodiment of the present invention will be described with reference made to the drawings. As is shown in FIG. 1, an anti-vibration device 1 includes: a cylindrical first mounting component 2 that is joined to a vibration generating portion; a second mounting component 3 that is joined to a vibration receiving portion; a first elastic body 4 that elastically joins the first mounting component 2 to the second mounting component 3; a diaphragm 6 that is placed inside the first mounting component 2 and that, in a portion of the inside of the first mounting component 2 between the diaphragm 6 and the first elastic body 4, forms a fluid chamber 5 inside which fluid is sealed; a cover component 7 that covers the diaphragm 6 from the external side thereof; a first partitioning wall 10 that partitions the fluid chamber 5 in the direction of an axis O so as to form a main fluid chamber 8, which has the first elastic body 4 forming a portion of the wall surfaces thereof, and an auxiliary fluid chamber 9; a second partitioning wall 12 that partitions the main fluid chamber 8 in a circumferential direction so as to form two (i.e., a plurality of) divided main fluid chambers 11A and 11B; and two (i.e., a plurality of) restricting passages 35 that respectively connect together the two divided main fluid chambers 11A and 11B and the auxiliary fluid chamber 9. This anti-vibration device 1 is a fluid-sealed type device, and, for example, ethylene glycol, water, silicone oil, and the like may be used for the fluid.

The first mounting component 2, the second mounting component 3, the first elastic body 4, the diaphragm 6, the cover component 7, and the first partitioning wall 10 are each formed in a cylindrical shape when seen in plan view or in a circular shape when seen in plan view, and are each positioned coaxially so as to share a common center axis. This common axis is referred to below as an axis O, and the main fluid chamber 8 side relative to the first partitioning wall 10 in the direction of the axis O is referred to as 'the one side', while the auxiliary fluid chamber 9 side relative to the first partitioning wall 10 in the direction of the axis O is referred to as 'the other side'. Moreover, a direction that is orthogonal to the axis O is taken as the radial direction, while a direction circling around the axis O is taken as the circumferential direction.

The first mounting component 2 includes: a small diameter portion 13 that engages with the first partitioning wall 10 inside an aperture end portion 13a on the aforementioned other side; a flange portion 14 that protrudes outwards in a radial direction from the other side aperture end portion 13a of the small diameter portion 13; a large diameter portion 15 that has a larger diameter than the small diameter portion 13 and protrudes towards the other side from an outside circumferential edge of the flange portion 14; and an enlarged diameter portion 16 that continues on towards the one side from the small diameter portion 13 and that becomes gradually larger in diameter from the other side towards the one side. The second mounting component 3 is formed in a circular disk shape, and is placed further to the one side than the first mounting component 2.

The first elastic body 4 is formed, for example, from a rubber material or the like in a cylindrical shape having an apex end. An apex wall portion 17 of this first elastic body 4 is vulcanized to the second mounting component 3 from the above-described other side, while a circumferential wall portion 18 of the first elastic body 4 gradually expands in diameter and also becomes thinner from the one side towards the other side. An aperture end portion 18a of the circumferential wall portion 18 of the first elastic body 4 is vulcanized to an inside circumferential surface of the enlarged diameter portion 16 of the first mounting component 2. As a result, the first elastic body 4 seals off the first mounting component 2 from the above-described one end side.

Note that in the example shown in the drawing, an inside circumferential surface of the small diameter portion 13 of the first mounting component 2 and an outside circumferential surface of the first mounting component 2 are covered by a coating membrane 19 that is formed, for example, from a rubber material or the like integrally with the first elastic body 4. Of this coating membrane 19, an inner circumferential side portion 20, which covers the inside circumferential surface of the small diameter portion 13, is joined to the aperture end portion 18a of the circumferential wall portion 18 of the first elastic body 4. A join portion 20a of this inside circumferential side portion 20 that is joined to the first elastic body 4 is formed thicker than the portion thereof that is located further to the aforementioned other side than the join portion 20a, and that covers the other side aperture end portion 13a of the small diameter portion 13. Moreover, an outer circumferential side portion 21 of the coating membrane 19 that covers an outside circumferential surface of the first mounting component 2 is joined to the inner circumferential side portion 20 via a communicating hole 22 that is formed in the small diameter portion 13.

Figure 2:
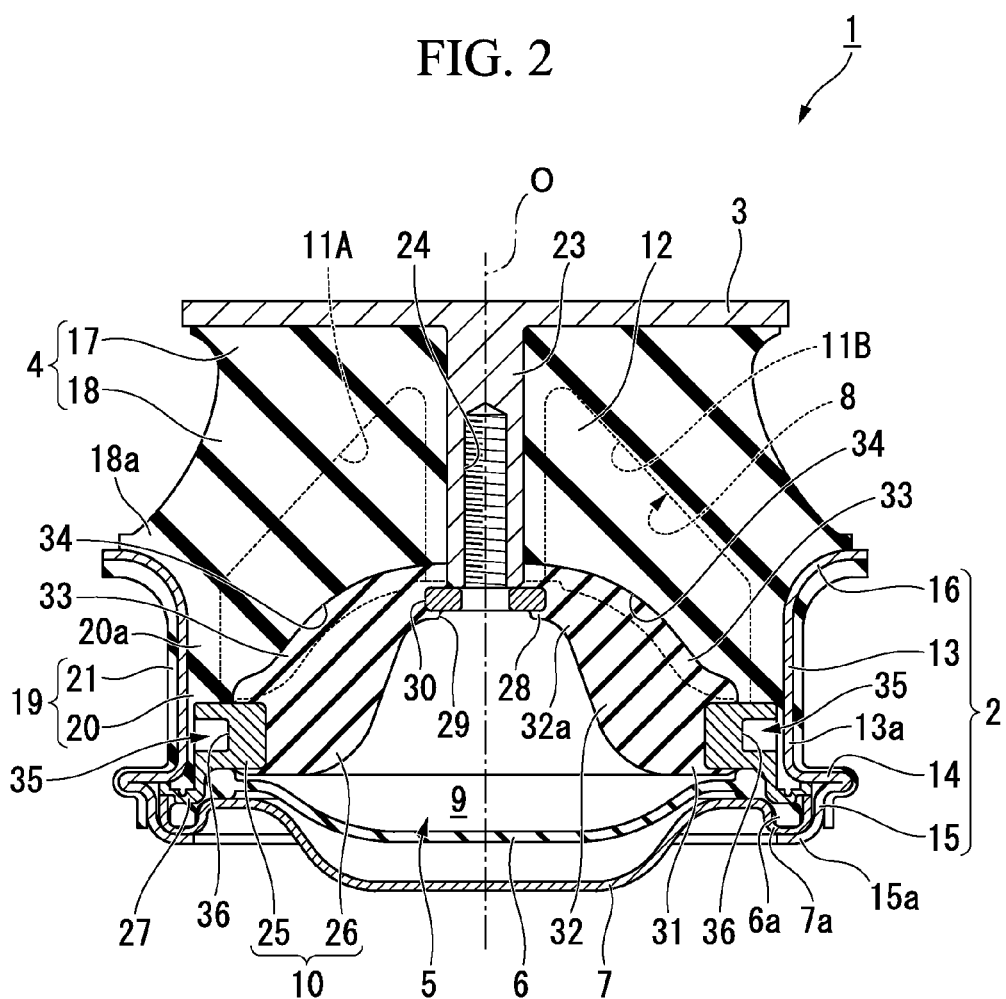
FIG. 2 is a cross-sectional view taken between arrows A-A shown in FIG. 1.
Figure 3:
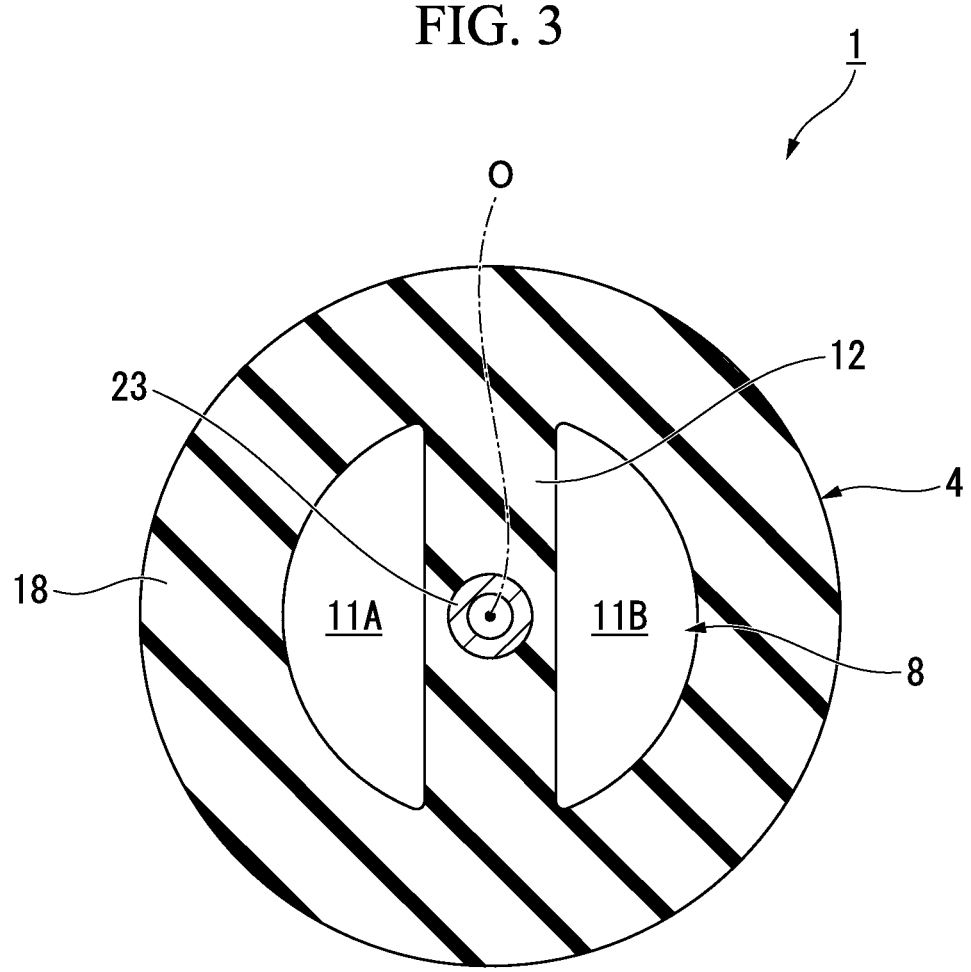
FIG. 3 is a cross-sectional view taken between arrows B-B shown in FIG. 1.

The second partitioning wall 12 is formed, for example, from an elastic material such as a rubber material or the like integrally with the first elastic body 4, and is joined to the second mounting component 3 via the first elastic body 4. As is shown in FIG. 2, this second partitioning wall 12 extends from the first elastic body 4 along the direction of the axis O towards the above-described other side and, as is shown in FIG. 3, intersects the interior of the main fluid chamber 8 in a radial direction so as to pass through the axis O. As a consequence, the two divided main fluid chambers 11A and 11B are formed as a result of the main fluid chamber 8 being divided into two equal parts. As is shown in FIG. 2, in the second partitioning wall 12, each of the two end portions thereof that face in a radial direction are joined to the join portion 20a of the coating membrane 19.

As is shown in FIG. 1, a connecting column portion 23 that extends towards the above-described other side is provided on the second mounting component 3. This connecting column portion 23 is aligned coaxially with the axis O, and passes through the apex wall portion 17 of the first elastic body 4 and also through the second partitioning wall 12. Moreover, in the connecting column portion 23, an end surface 23a thereof that faces towards the above-described other side is exposed to the other side from the second partitioning wall. A female thread portion 24 into which a connecting bolt (not shown) is screwed is formed in this end surface 23a.

The first partitioning wall 10 is formed by a toroidal component 25 that fits inside the first mounting component 2, and a second elastic body 26 that is formed, for example, from a rubber material or the like so as to be elastically deformable and that is placed inside the toroidal component 25. Both the toroidal component 25 and the second elastic body 26 are placed coaxially with the axis O. The toroidal component 25 is fitted inside the other side aperture end portion 13a of the small diameter portion 13 of the first mounting component 2, and abuts from the other side against the join portion 20a of the coating membrane 19. Moreover, an inside circumferential edge of a contact flange portion 27 that comes into contact with the flange portion 14 of the first mounting component 2 is joined from the other side to an outside circumferential edge of the toroidal component 25. Moreover, an outside circumferential edge portion 31 of the second elastic body 26 is vulcanized to an inside circumferential surface of the toroidal component 25. As a result, the outside circumferential edge portion 31 of the second elastic body 26 is joined via the toroidal component 25 to the first mounting component 2.

A central portion 28 in the radial direction of the second elastic body 26 is joined via the connecting column portion 23 to the second partitioning wall 12. In the present embodiment, in this central portion 28, the first mounting component 2 is joined to a vibration generating portion, while the second mounting component 3 is joined to a vibration receiving portion. In a joined state, the central portion 28 extends in a flat shape in the radial direction when no vibration is being input. Moreover, a through hole 29 that is positioned coaxially with the axis O is formed in the central portion 28, and an inside circumferential surface of this through hole 29 is vulcanized to a connecting ring 30 that is placed inside the through hole 29 coaxially with the axis O, and through which the aforementioned connecting bolt is inserted. When the connecting bolt that has been inserted into the connecting ring 30 from the above-described other side is then screwed into the female thread portion 24 of the connecting column portion 23, the central portion 28 of the second elastic body 26 is joined to the connecting column portion 23.

Of the second elastic body 26, an intermediate portion 32, which is positioned between the central portion 28 and the outside circumferential edge portion 31, is inclined in the direction of the axis O relative to the central portion 28 in the aforementioned joined state. In the example shown in the drawings, in the joined state, the intermediate portion 32 extends gradually towards the above-described other side from the inside towards the outside in the radial direction. Furthermore, in the joined state, the intermediate portion 32 is curved such that it protrudes towards the above-described one side (i.e., towards the main fluid chamber side in the axial direction).

In the present embodiment, the intermediate portion 32 of the second elastic body 26 has differences in rigidity in the radial direction. In the example shown in the drawings, as a result of the thickness of the intermediate portion 32 of the second elastic body 26 varying at each position in the radial direction, the intermediate portion 32 of the second elastic body 26 has differences in rigidity in the radial direction. The intermediate portion 32 of the second elastic body 26 becomes gradually thicker from the inside towards the outside in the radial direction, so that the rigidity of the intermediate portion 32 becomes gradually greater from the inside towards the outside (i.e., from the central portion side towards the outer circumferential edge portion side) in the radial direction. Note that the thickness of the second elastic body 26 is the same irrespective of the position in the circumferential direction, so that the rigidity of the second elastic body 26 is the same irrespective of the position in the circumferential direction.

As is shown in FIG. 2, engaging convex portions 33 that protrude onto the above-described one side and extend in the radial direction are provided on the second elastic body 26. One of these engaging convex portions 33 is formed on the second elastic body 26 in each of the two portions on either side of the axis O. Each engaging convex portion 33 is formed on either side of the axis O on the end surfaces of the second partitioning wall 12 that face the above-described other side, and the engaging convex portions 33 are engaged respectively within two groove-shaped engaging concave portions 34 that also extend in the radial direction. As is shown in FIG. 1, the divided main fluid chambers 11A and 11B are defined by the circumferential wall portion 18 of the first elastic body 4, the join portion 20a of the coating membrane 19, the toroidal component 25 and second elastic body 26 of the first partitioning wall 10, and the second partitioning wall 12.

The cover component 7 is formed in an inverted hat shape, and an outside circumferential edge portion 7a of a brim portion of the cover component 7 is bent into a U shape when viewed in a vertical cross-section that opens onto the above-described one side. The cover component 7 is placed within the large diameter portion 15 of the first mounting component 2, and the outside circumferential edge portion 7a of the cover component 7 is sandwiched between the contact flange portion 27 of the first partitioning wall 10 and the other side aperture end portion 15a of the large diameter portion 15 of the first mounting component 2 that has been crimped on the inside in the radial direction.

The diaphragm 6 is formed in an inverted hat shape, and an outside circumferential edge portion 6a of a brim portion of the diaphragm is 6 placed within the outside circumferential edge portion 7a of the cover component 7, and is sandwiched between this outside circumferential edge portion 7a and the contact flange portion 27 of the first partitioning wall 10.

Two restricting passages 35 are formed in the first partitioning wall 10. These restricting flow passages 35 include a circumferential groove 36 that is formed in the toroidal component 25, a main fluid chamber-side aperture portion 37 that enables the circumferential groove 36 to communicate with the main fluid chamber 8, and an auxiliary fluid chamber-side aperture portion (not shown) that enables the circumferential groove 36 to communicate with the auxiliary fluid chamber 9. Two circumferential grooves 36 are formed in the outside circumferential surface of the toroidal component 25. These two circumferential grooves 36 do not communicate with each other, and are sealed off by the coating membrane 19 from the outward side in the radial direction. The main fluid chamber-side aperture portion 37 enables the circumferential groove 36 to communicate with the main fluid chamber 8 via a communicating groove 38 that is formed in the join portion 20a of the coating membrane 19.

The flow path length and flow path cross-sectional area of each restricting passage 35 are set (i.e., are tuned) such that the resonance frequency of that restricting passage 35 is set to a predetermined frequency. Examples of this predetermined frequency include, for example, the frequency of the idling vibration (for example, a frequency of 18 Hz~30 Hz, and an amplitude of ±0.5 mm or less), and the frequency of the shaking vibration (for example, a frequency of 14 Hz or less, and an amplitude greater than ±0.5 mm), which is a lower frequency than that of the idling vibration. Moreover, the resonance frequencies of each restricting passage 35 may be the same as each other, or may be different from each other.

The anti-vibration device 1 that has the above-described structure is a compression-type (i.e., upright-type) of device that is mounted such that the main fluid chamber 8 is positioned on the upper side in a vertical direction, and such that the auxiliary fluid chamber 9 is positioned on the lower side in the vertical direction. For example, when this anti-vibration device 1 is mounted in a vehicle, the first mounting component 2 is connected to an engine, which serves as a vibration generating portion, while the second mounting component 3 is joined via a bracket (not shown) to the vehicle body, which serves as a vibration receiving portion. Note that in a vehicle, it is easy for vibration to be input from the engine to the vehicle body in the front-rear direction or left-right direction of the vehicle. Because of this, this anti-vibration device 1 is mounted such that, for example, out of the radial directions, a direction which is parallel to the direction in which the divided main fluid chambers 11A and 11B extend on either side of the axis O coincides with either the aforementioned front-rear direction or the aforementioned left-right direction.

Next, an example of a method of forming an anti-vibration device in which the first mounting component 2 and the second mounting component 3 are joined together via the first elastic body 4 will be described. Firstly, the first mounting component 2, the second mounting component 3, and the connecting column portion 23 are placed within a metal mold for an anti-vibration device body (not shown), and adhesive surface preparation is performed on each of the mounting components 2 and 3 and on the connecting column portion 23. Thereafter, unvulcanized rubber is injected into the metal mold, and the first elastic body 4, the coating membrane 19, and the second partitioning wall 12 are molded into a single integral unit via vulcanization molding. The metal mold is then demolded in the direction of the axis O so that the anti-vibration device body is formed. In the present embodiment, because the second partitioning wall 12 extends along the direction of the axis O from the first elastic body 4 towards the above-described other side, the metal mold can be smoothly demolded in the direction of the axis O.

Figure 4:
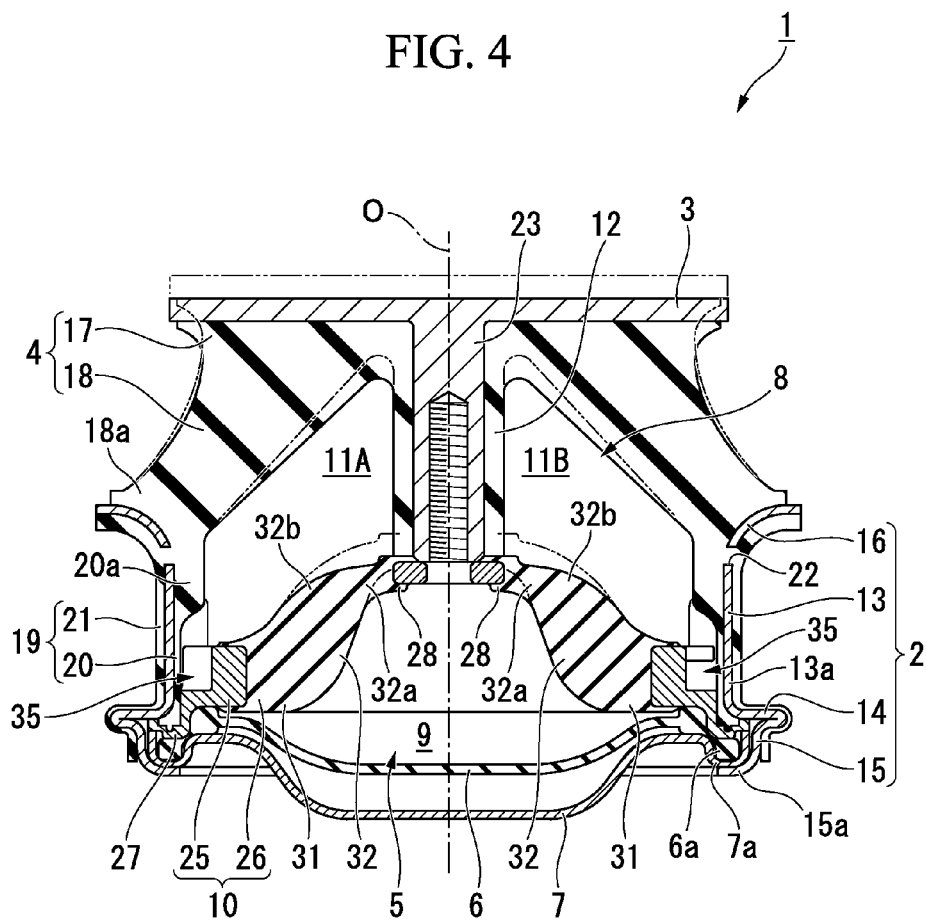
FIG. 4 is a vertical cross-sectional view showing a state of an anti-vibration device when vibration in an axial direction is input into the anti-vibration device shown in FIG. 1.

Next, an operation of the anti-vibration device 1 that has the above-described structure will be described. As is shown in FIG. 4, when vibration is input into the anti-vibration device 1 in the direction of the axis O from the vibration generating portion so that the first mounting component 2 and the second mounting component 3 are displaced relative to each other in the direction of the axis O, the first elastic body 4 that joins the mounting components 2 and 3 together is elastically deformed. At this time, because the second partitioning wall 12, which is joined to the second mounting component 3, is displaced together with the second mounting component 3, the second elastic body 26 is also elastically deformed. In the present embodiment, the intermediate portion 32 of this second elastic body 26 that is positioned between the outside circumferential edge portion 31, which is joined to the first mounting component 2, and the central portion 28, which is joined to the second partitioning wall 12, is elastically deformed.

For example, as is shown in FIG. 4, when the first mounting component 2 and the second mounting component 3 approach each other in the direction of the axis O, the circumferential wall portion 18 of the first elastic body 4 becomes gradually more and more deformed towards the above-described other side around the fulcrum provided by the aperture end portion 18a, so as to cause the volumes of the divided main fluid chambers 11A and 11B to decrease. At this time, the intermediate portion 32 of the second elastic body 26 is also deformed towards the above-described other side around the fulcrum provided by the outside circumferential portion 31, so as to cause the volumes of the divided main fluid chambers 11A and 11B to increase. Here, because the intermediate portion 32 of the second elastic body 26 has variations in rigidity in the radial direction, the amount of deformation of this intermediate portion 32 differs depending on the position in the radial direction. In the example shown in the drawing, of the intermediate portion 32, a connecting portion 32a where the intermediate portion 32 connects to the central portion 28, which has a low rigidity, is elastically deformed so as to follow the displacement of the second partitioning wall 12. In conjunction with this, it is possible to suppress the elastic deformation of the other portions whose rigidity is higher than that of the connecting portion 32a. Accordingly, the amount of increase in the volumes of the divided main fluid chambers 11A and 11B that is caused by the deformation of the intermediate portion 32 of the second elastic body 26 is less than the amount of decrease in the volume of the main fluid chamber 11 that is caused by the deformation of the circumferential wall portion 18 of the first elastic body 4. Namely, the overall volume of the divided main fluid chambers 11A and 11B can be made to decrease.

Moreover, by changing the volumes of the divided main fluid chambers 11A and 11B in this manner, fluid can be made to travel via the restricting passages 35 backwards and forwards between the divided main fluid chambers 11A and 11B and the auxiliary fluid chambers 9, so that liquid column resonance can be generated inside the restricting passages 35. Vibration in the direction of the axis O can be absorbed and attenuated by this liquid column resonance. In the present embodiment, when vibration in the direction of the axis O is input into this anti-vibration device 1, the volumes of the two divided main fluid chambers 11A and 11B change simultaneously, and fluid circulates simultaneously through the two restricting passages 35.

Figure 5:
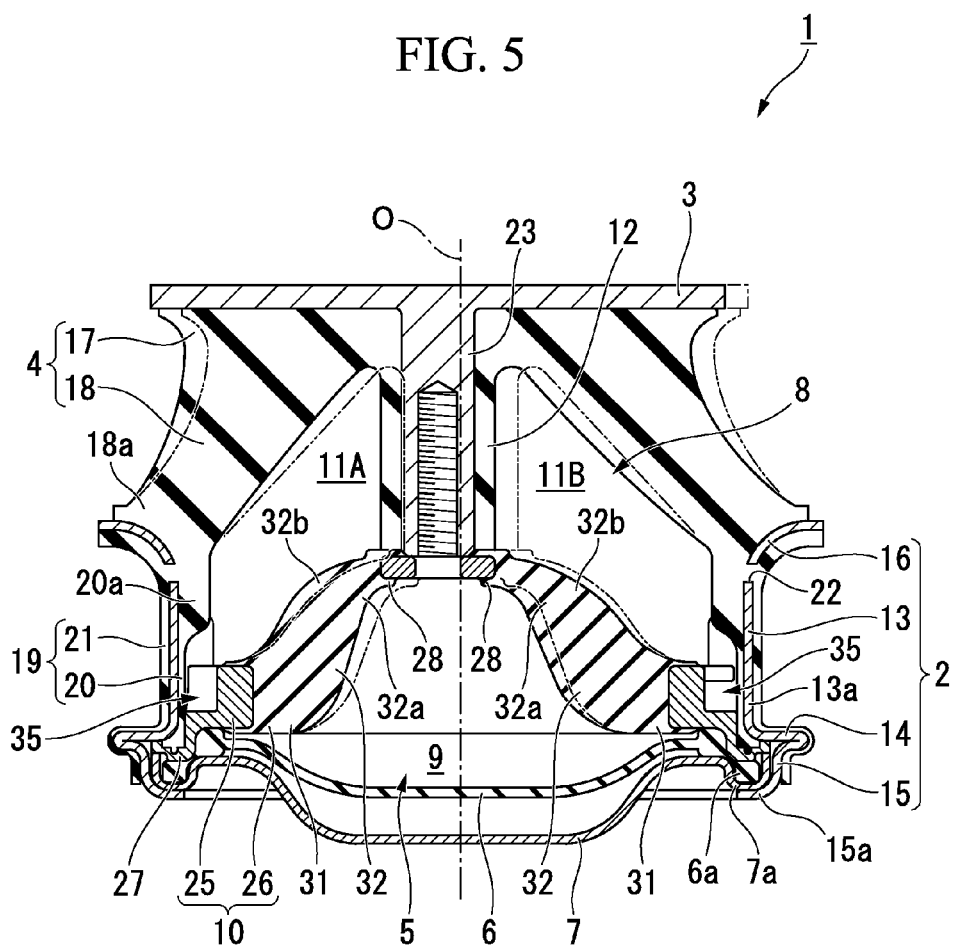
FIG. 5 is a vertical cross-sectional view showing a state of an anti-vibration device when vibration in a parallel direction is input into the anti-vibration device shown in FIG. 1.

Moreover, as is shown in FIG. 5, vibration in the above-described parallel direction is also input from the vibration generating portion into the anti-vibration device 1, so that the first mounting component 2 and the second mounting component 3 are displaced relatively in this parallel direction. At this time, not only is the first elastic body 4 elastically deformed, but the second partitioning wall 12 is also displaced following the second mounting component 3, so that the intermediate portion 32 of the second elastic body 26 is elastically deformed.

At this time, in the divided main fluid chamber 11A that is positioned on a displacement side onto which the second mounting component 3 has been displaced relative to the center axis of the first mounting component 2 in the above-described parallel direction (i.e., that is positioned on the left side in FIG. 5), the first elastic body 4 is deformed onto this displacement side such that the volume of the divided main fluid chamber 11A increases. In addition, the second partitioning wall 12 is also displaced onto this displacement side following the second mounting component 3, and the intermediate portion 32 of the second elastic body 26 is deformed onto the displacement side such that the volume of the divided main fluid chamber 11A decreases. Accordingly, the amount of decrease in the volume of the divided main fluid chamber 11A that is caused by the displacement of the second partitioning wall 12 and by the deformation of the intermediate portion 32 of the second elastic body 26 is greater than the amount of increase in the volume thereof that is generated solely by the deformation of the first elastic body 4. Because of this, the overall volume of the divided main fluid chamber 11A can be made to decrease. Moreover, the portion of the intermediate portion 32 of the second elastic body 26 that defines the divided main fluid chamber 11A is elastically deformed onto the aforementioned displacement side with the connecting portion 32a being used as a fulcrum such that the curvature of the curved portion 32b of the intermediate portion 32 increases. As a consequence of this, it becomes easy to secure the amount of decrease in the volume of the divided main fluid chamber 11A that is caused by the deformation of the second elastic body 26, so that the overall volume of the divided main fluid chamber 11A can be made to decrease with certainty.

In contrast, in the divided main fluid chamber 11B that is positioned on the anti-displacement side in the above-described parallel direction (i.e., on the right side in FIG. 5), the second partitioning wall 12 is displaced onto the displacement side following the second mounting component 3, and the intermediate portion 32 of the second elastic body 26 is deformed onto the displacement side such that the volume of the divided main fluid chamber 11B increases. Moreover, the first elastic body 4 is deformed onto the displacement side such that the volume of the divided main fluid chamber 11B decreases. Accordingly, the amount of increase in the volume of the divided main fluid chamber 11B that is caused by the displacement of the second partitioning wall 12 and by the deformation of the intermediate portion 32 of the second elastic body 26 is greater than the amount of decrease in the volume thereof that is generated by the deformation of the first elastic body 4. Because of this, the overall volume of the divided main fluid chamber 11B can be made to increase. Moreover, the portion of the intermediate portion 32 of the second elastic body 26 that defines the divided main fluid chamber 11B is elastically deformed onto the aforementioned displacement side with the connecting portion 32a being used as a fulcrum such that the curvature of the curved portion 32b decreases. As a consequence of this, it becomes easy to secure the amount of increase in the volume of the divided main fluid chamber 11B that is caused by the deformation of the second elastic body 26, so that the overall volume of the divided main fluid chamber 11B can be made to increase with certainty.

By changing the volumes of the divided main fluid chambers 11A and 11B in this manner, the aforementioned liquid column resonance can be generated, and vibration in the above-described parallel direction can be absorbed and attenuated. Note that in the present embodiment, while vibration is being input in the above-described parallel direction, the divided main fluid chamber 11A and the divided main fluid chamber 11B expand and contract alternatingly, so that fluid circulates simultaneously through the two restricting passages 35.

As has been described above, according to the anti-vibration device 1 of the present embodiment, there are provided the divided main fluid chambers 11A and 11B, the auxiliary fluid chamber 9, and the restricting passages 35 that enable these to communicate with each other. Consequently, this anti-vibration device 1 is able to demonstrate attenuation characteristics towards vibration in both the above-described direction of the axis O and the above-described parallel direction. As a result, the fluid chambers and restricting passages can be decreased, and it is possible to achieve a reduction in the size, a simplification of the structure, and a simplification of the manufacturing process of the anti-vibration device.

Moreover, the rigidity of the intermediate portion 32 of the second elastic body 26 becomes gradually greater from the inside towards the outside in a radial direction. Because of this, when the first mounting component 2 and the second mounting component 3 and second partitioning wall 12 are displaced relative to each other in the direction of the axis O, the connecting portion 32a of the intermediate portion 32 of the second elastic body 26 can be allowed to be elastically deformed following the displacement of the second partitioning wall 12, while at the same time any elastic deformation of the remaining portions is suppressed. As a consequence, it becomes simple to change the volumes of the divided main fluid chambers 11A and 11B, and to effectively demonstrate attenuation characteristics towards vibration in the direction of the axis O.

Moreover, the central portion 28 of the second elastic body 26 is joined to the second partitioning wall 12, while the outside circumferential edge portion thereof is joined to the first mounting component 2, and the rigidity of the second elastic body 26 remains the same irrespective of the position in the circumferential direction. Because of these, the attitudes of the first mounting component 2 and the second mounting component 3 can be stabilized when the two mounting components 2 and 3 are displaced relative to each other in the direction of the axis O.

Moreover, in the above-described joined state, the central portion 28 of the second elastic body 26 extends in a radial direction while the intermediate portion 32 thereof is inclined in the direction of the axis O relative to the central portion 28. Because of this, when the first mounting component 2 and the second mounting component 3 are displaced relative to each other in the above-described parallel direction, it is easy for the intermediate portion 32 to be elastically deformed with the connecting portion 32a of the intermediate portion 32 of the second elastic body 26 being used as a fulcrum. As a consequence, it becomes simple to change the volumes of the divided main fluid chambers 11A and 11B, and to effectively demonstrate attenuation characteristics towards vibration in the parallel direction.

Moreover, in the above-described joined state, the intermediate portion 32 of the second elastic body 26 is curved such that it protrudes towards the above-described one side. Because of this, when the first mounting component 2 and the second mounting component 3 are displaced relative to each other in the above-described parallel direction, it is easy to cause the intermediate portion 32 to be elastically deformed such that the curvature of the curved portion 32b in the intermediate portion 32 of the second elastic body 26 increases while the volumes of the divided main fluid chambers 11A and 11B decrease, or such that the curvature of the curved portion 32b decreases while the volumes of the divided main fluid chambers 11A and 11B increase. As a consequence, it becomes simple to change the volumes of the divided main fluid chambers 11A and 11B, and to more effectively demonstrate attenuation characteristics towards vibration in the parallel direction.

Moreover, the two divided main fluid chambers 11A and 11B are provided, and these divided main fluid chambers 11A and 11B communicate with the auxiliary fluid chamber 9 via their respective restricting passages 35. Because of this, it is possible to generate liquid column resonance simultaneously inside both of the restricting passages 35. As a result, when the resonance frequencies of the restricting passages 35 are both the same as each other, it becomes possible to effectively demonstrate attenuation characteristics towards predetermined frequencies. Moreover, when the resonance frequencies of the restricting passages 35 have been made mutually different, it becomes possible to demonstrate attenuation characteristics towards a plurality of types of vibration.

Furthermore, as a result of the thickness of the second elastic body 26 being different at each position in the radial direction, there are differences in the rigidity of the second elastic body 26 in the radial direction. Because of this, it is possible to form the second elastic body 26 from a single elastic material, and even greater simplifications of the structure and the manufacturing process can be achieved.

Note that the range of technology of the present invention is not limited to the above-described embodiment, and various modifications are possible insofar as they do not depart from the scope of the present invention.

For example, it is not necessary for the cover component 7 to be provided. Moreover, in the above-described embodiment, the restricting passages 35 are formed in the first partitioning wall 10, however, the present invention is not limited to this. For example, it is also possible for the restricting passages 35 to be formed in a different component from the first partitioning wall 10.

Moreover, in the above-described embodiment, the first partitioning wall 10 is formed by the toroidal component 25 and the second elastic body 26, however, it is not necessary for the toroidal component 25 to be provided. For example, it is also possible for the first partitioning wall 10 to be formed solely by the second elastic body 26, and for the second elastic body 26 to be fitted inside the first mounting component 2. Furthermore, in the present embodiment, the second elastic body 26 is positioned coaxially with the axis O, however, it is also possible for the second elastic body 26 to be offset from the axis O.

Moreover, in the above-described embodiment, the rigidity of the second elastic body 26 is the same irrespective of the position in the circumferential direction, however, the present invention is not limited to this. Furthermore, in the above-described embodiment, the rigidity of the intermediate portion 32 of the second elastic body 26 varies in the radial direction as a result of the thickness thereof being different at each position in the radial direction, however, the present invention is not limited to this. For example, it is also possible to make the rigidity of the intermediate portion 32 of the second elastic body 26 vary in the radial direction by using a plurality of types of elastic material for this intermediate portion 32 so as to use a different type of elastic material depending on the position in the radial direction.

Moreover, in the above-described embodiment, the rigidity of the intermediate portion 32 of the second elastic body 26 becomes gradually higher from the inside towards the outside in the radial direction, however, the present invention is not limited to this. For example, it is also possible to make the rigidity of the intermediate portion 32 of the second elastic body 26 gradually lower from the inside towards the outside in the radial direction. Furthermore, in the above-described embodiment, in the above-described joined state, the intermediate portion 32 of the second elastic body 26 is curved such that it protrudes outwards towards the above-described one side, however, it is not necessary for this curve to be provided.

Moreover, in the above-described embodiment, in the aforementioned joined state, the intermediate portion 32 of the second elastic body 26 extends gradually towards the above-described other side from the inside towards the outside in the radial direction. However, it may also be inclined in the direction of the axis O relative to the central portion 28; for example, it is also possible for the intermediate portion 32 of the second elastic body 26 to extend gradually towards the above-described one side from the inside towards the outside in the radial direction. In the above-described joined state, it is also possible for the intermediate portion 32 of the first elastic body 4 to not be inclined in the direction of the axis O relative to the central portion 28, and also for it not to extend in the radial direction.

Moreover, in the above-described embodiment, the connecting column portion 23 and the connecting ring 30 are provided, however it is not necessary for these to be provided. In this case, for example, the central portion 28 of the second elastic body 26 may be fixed by adhesion or the like to the second partitioning wall 12. In this case, when the first mounting component 2 and the second mounting component 3 are displaced relative to each other in the above-described parallel direction, instead of the second partitioning wall 12 being displaced following the second mounting component 3, it may be deformed following the second mounting component 3. Furthermore, in the above-described embodiment, the central portion 28 of the second elastic body 26 is joined to the second partitioning wall 12, however, provided that the second elastic body 26 is joined to the second partitioning wall 12, then it is also possible, for example, for a portion other than the central portion 28 to be joined and for the central portion 28 to not be joined.

Moreover, in the above-described embodiment, the engaging concave portions 34 are formed in the second partitioning wall 12, and the engaging convex portions 33 are formed in the second elastic body 26, however, the present invention is not limited to this. For example, it is also possible for engaging convex portions to be formed in the second partitioning wall 12, and for engaging concave portions to be formed in the second elastic body 26. Instead of providing the engaging concave portions and engaging convex portions, it is also possible to bond the second partitioning wall 12 and the second elastic body 26 together, or to simply place the second partitioning wall 12 and the second elastic body 26 in contact with each other.

Moreover, in the above-described embodiment, the second partitioning wall 12 is formed integrally with the first elastic body 4, however, the present invention is not limited to this. For example, it is also possible for the second partitioning wall 12 to be formed integrally with the second elastic body 26, or for the second partitioning wall 12 to be formed as an independent body separate from both the first elastic body 4 and the second elastic body 26.

Moreover, in the above-described embodiment, the second partitioning wall 12 is joined to the second mounting component 3 via the first elastic body 4, however, it is sufficient simply for the second partitioning wall 12 to be joined to the second mounting component 3. For example, the second partitioning wall 12 may be joined directly to the second mounting component 3 without the first elastic body 4 being interposed between the two. The second partitioning wall may also be formed from an elastic material.

Moreover, in the above-described embodiment, the second partitioning wall 12 is positioned such that it passes through the axis O, however, it may also be located at a position that is offset from the axis O. Furthermore, in the above-described embodiment, a structure is employed in which the main fluid chamber 8 is divided by the second partitioning wall 12 into the two divided main fluid chambers 11A and 11B, however, it is sufficient for the main fluid chamber 8 to be divided into a plurality of divided main fluid chambers 11. For example, it is also possible to form the second partitioning walls 12 in a radial pattern when they are looked at in a top view from the direction of the axis O. By doing this, it is possible to effectively demonstrate attenuation characteristics towards vibrations generated in a plurality of radial directions.

Moreover, in the above-described embodiment, the first mounting component 2 is joined to a vibration generating portion, while the second mounting component 3 is joined to a vibration receiving portion, however, the present invention is not limited to this. For example, it is also possible for the first mounting component 2 to be joined to a vibration receiving portion, and for the second mounting component 3 to be joined to a vibration generating portion. Namely, it is sufficient for the first mounting component 2 to be joined to one of the vibration generating portion and the vibration receiving portion, and for the second mounting component 3 to be joined to the other one thereof.

Moreover, in the above-described embodiment, a compression-type of anti-vibration device 1 has been illustrated. However, the anti-vibration device 1 may also be a suspension type of anti-vibration device that is mounted such that the main fluid chamber is positioned on the lower side in a vertical direction, and the auxiliary fluid chamber is positioned on the upper side in a vertical direction.

Moreover, the anti-vibration device 1 of the present invention is not restricted to the engine mount of a vehicle, and may also be used for applications other than an engine mount. For example, the anti-vibration device 1 of the present invention may also be used in the mounting of generators that are installed in construction machinery, and in the mounting of machines installed in factories and the like.

In addition to this, the component elements of the above-described embodiment can also be replaced where this is appropriate by commonly known component elements insofar as this does not negate the scope of the present invention. Moreover, combinations of the above-described variant examples may also be employed where this is appropriate.

DESCRIPTION OF THE REFERENCE NUMERALS

1 ... Anti-vibration device
2 ... First mounting component
3 ... Second mounting component
4 ... First elastic body
5 ... Fluid chamber
8 ... Main fluid chamber
9 ... Auxiliary fluid chamber
10 ... First partitioning wall
11A, 11B ... Divided main fluid chambers
12 ... Second partitioning wall
26 ... Second elastic body
28 ... Central portion
31 ... Outside circumferential edge portion
32 ... Intermediate portion
35 ... Restricting passages
O ... Axis

What is claimed is:

1. An anti-vibration device comprising:
a first mounting component that is cylindrically-shaped and joined to one of a vibration generating portion and a vibration receiving portion;
a second mounting component that is joined to the other one of the vibration generating portion and the vibration receiving portion;
a first elastic body that elastically joins the first mounting component and the second mounting component together;
a fluid chamber that is provided inside the first mounting component and inside which a fluid is sealed;
a first partitioning wall that divides the fluid chamber in an axial direction so as to define a main fluid chamber, a portion of wall surfaces of the first elastic body forms the main fluid chamber, and a partition-less auxiliary fluid chamber;
a second partitioning wall that divides the main fluid chamber in a circumferential direction so as to define a plurality of divided main fluid chambers; and
a plurality of restricting passages that enable the plurality of divided main fluid chambers and the auxiliary fluid chamber to communicate with each other,
wherein at least a portion of the first partitioning wall is formed by a second elastic body that is elastically deformable, the second partitioning wall is joined to both the second mounting component and the second elastic body, and
the second elastic body has differences in rigidity in a radial direction and divides the main fluid chamber from the auxiliary fluid chamber,
wherein a central portion in a radial direction of the second elastic body is joined to the second partitioning wall, while an outside circumferential edge portion of the second elastic body is joined to the first mounting component, and an intermediate portion that is located between the central portion and the outside circumferential edge portion has the differences in rigidity in a radial direction,
wherein the rigidity of the intermediate portion of the second elastic body gradually increases from a central portion side towards an outside circumferential edge portion side, the rigidity being substantially constant along a circumferential direction at each radial location, and
wherein an upper surface of the second elastic body forming the plurality of divided main fluid chambers and provided at the outside circumferential edge portion is offset in the axial direction toward the auxiliary fluid chamber from a lower surface opposite to the upper surface of the second elastic body forming the auxiliary fluid chamber and provided at the central portion of the second elastic body.

2. The anti-vibration device according to claim 1, wherein, in a joined state in which the first mounting component is joined to one of the vibration generating portion and the vibration receiving portion, and the second mounting component is joined to the other one of the vibration generating portion and the vibration receiving portion, the intermediate portion of the second elastic body is curved so as to protrude in the axial direction towards a main fluid chamber side.

3. The anti-vibration device according to claim 1, wherein, in a joined state in which the first mounting component is joined to one of the vibration generating portion and the vibration receiving portion, and the second mounting component is joined to the other one of the vibration generating portion and the vibration receiving portion, the central portion of the second elastic body is formed in a planar shape extending in a radial direction, while the intermediate portion of the second elastic body is inclined in the axial direction relative to the central portion.

4. The anti-vibration device according to claim 2, wherein, in a joined state in which the first mounting component is joined to one of the vibration generating portion and the vibration receiving portion, and the second mounting component is joined to the other one of the vibration generating portion and the vibration receiving portion, the central portion of the second elastic body is formed in a planar shape extending in a radial direction, while the intermediate portion of the second elastic body is tilted in the axial direction relative to the central portion.

5. The anti-vibration device according to claim 1, wherein the auxiliary fluid chamber is defined by the second elastic body and a diaphragm provided inside the first mounting component.

* * * * *